(12) United States Patent
Larry et al.

(10) Patent No.: US 12,030,436 B2
(45) Date of Patent: Jul. 9, 2024

(54) VEHICLE LIGHTING AND DISPLAY SYSTEMS USING SWITCHABLE OPAQUE FILM

(71) Applicant: Ford Global Technologies, LLC, Dearborn, MI (US)

(72) Inventors: Mark Larry, Macomb, MI (US); Biaohe Guo, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/208,393

(22) Filed: Jun. 12, 2023

(65) Prior Publication Data
US 2023/0339411 A1   Oct. 26, 2023

Related U.S. Application Data

(62) Division of application No. 16/742,217, filed on Jan. 14, 2020, now Pat. No. 11,718,242.

(51) Int. Cl.
*B60R 11/02* (2006.01)
*B32B 17/10* (2006.01)
(Continued)

(52) U.S. Cl.
CPC .... *B60R 11/0229* (2013.01); *B32B 17/10036* (2013.01); *B32B 17/10495* (2013.01);
(Continued)

(58) Field of Classification Search
CPC ......... B60R 11/0229; B60R 2011/0026; B32B 17/10036; B32B 17/10495; B32B 17/10504; B32B 17/10541; B32B 2307/41; B32B 2307/412; B32B 2605/08; B32B 7/12; B32B 17/10165; B60Q 1/50; E06B 9/24; E06B 2009/2417; E06B 2009/2464; G02F 1/1334; G02F 1/1677; G02F 2201/44; G02F 1/1303; G02F 1/1333; G02F 1/13452; G02F 1/133; G09F 21/049; G09F 9/30; G09F 9/00; B60J 3/04; G02B 27/01; F21S 41/64; F21S 41/143; F21S 41/155; F21S 41/645; F21S 43/00; F21S 43/14;
(Continued)

(56) References Cited

U.S. PATENT DOCUMENTS 10,520,782 B2   12/2019   Busch
2010/0097293 A1   4/2010   McMahon
(Continued)

FOREIGN PATENT DOCUMENTS

CN   109458107 A2   3/2017
DE   102015120191 A1   5/2017

*Primary Examiner* — Kevin Quarterman
(74) *Attorney, Agent, or Firm* — Vichit Chea; Carlson, Gaskey & Olds, P.C.

(57) ABSTRACT

An apparatus and method, according to an exemplary aspect of the present disclosure includes, among other things, a transparent lighting source, a switchable opaque film bonded to the transparent lighting source to provide a vehicle component, and an electrical connection that connects to the transparent lighting source and the switchable opaque film such that the switchable opaque film is electrically controlled to switch between an opaque state and a transparent state. A control unit independently controls the switchable opaque film and the transparent lighting source based on a predetermined application for the vehicle component.

20 Claims, 4 Drawing Sheets

(51) Int. Cl.
   *B60Q 1/50*       (2006.01)
   *E06B 9/24*       (2006.01)
   *G09F 21/04*      (2006.01)
   *B60R 11/00*      (2006.01)
   *G02F 1/1334*     (2006.01)
   *G02F 1/1677*     (2019.01)

(52) U.S. Cl.
   CPC .. *B32B 17/10504* (2013.01); *B32B 17/10541* (2013.01); *B60Q 1/50* (2013.01); *E06B 9/24* (2013.01); *G09F 21/0485* (2021.05); *B60R 2011/0026* (2013.01); *E06B 2009/2417* (2013.01); *E06B 2009/2464* (2013.01); *G02F 1/1334* (2013.01); *G02F 1/1677* (2019.01); *G02F 2201/44* (2013.01)

(58) Field of Classification Search
   CPC ... F21S 43/145; F21V 14/003; F21Y 2115/10; F21Y 2115/15
   See application file for complete search history.

(56) References Cited

U.S. PATENT DOCUMENTS

| | | |
|---|---|---|
| 2016/0027391 A1 | 1/2016 | Gibson et al. |
| 2018/0217429 A1 | 8/2018 | Busch |
| 2018/0373092 A1 | 12/2018 | Eley et al. |

VEHICLE LIGHTING AND DISPLAY SYSTEMS USING SWITCHABLE OPAQUE FILM

CROSS-REFERENCE TO RELATED APPLICATION

This application is a divisional of prior U.S. application Ser. No. 16/742,217, filed Jan. 14, 2020, and which is incorporated herein by reference.

TECHNICAL FIELD

This disclosure relates generally to vehicle lighting and display systems, and more specifically relates to such systems that use a transparent light source and a switchable opaque film.

BACKGROUND

Exterior vehicle lighting is used for different applications including traditional light sources, such as light bars and center high-mounted stop lamp (CHMSL) applications, as well as for new applications such as pedestrian communication and vehicle movement indication, for example. Additionally, vehicles are required to provide rear or side view images in a display format to assist with a vehicle back up function. Current lighting and display solutions do not provide sufficient customization and flexibility to address the incorporation of such systems into vehicle windows and windshields.

SUMMARY

An apparatus according to an exemplary aspect of the present disclosure includes, among other things, a transparent lighting source, a switchable opaque film bonded to the transparent lighting source to provide a vehicle component, and an electrical connection that connects to the transparent lighting source and the switchable opaque film such that the switchable opaque film is electrically controlled to switch between an opaque state and a transparent state. A control unit independently controls the switchable opaque film and the transparent lighting source based on a predetermined application for the vehicle component.

In a further non-limiting embodiment of the foregoing apparatus, the switchable opaque film and the transparent lighting source are laminated together to form a layered structure.

In a further non-limiting embodiment of any of the foregoing apparatus, the layered structure is integrated between two layers of glass.

In a further non-limiting embodiment of any of the foregoing apparatus, the transparent lighting source comprises at least one of an organic light emitting diode, micro light emitting diode, or quantum dot.

In a further non-limiting embodiment of any of the foregoing apparatus, the switchable opaque film comprises a polymer-dispersed liquid crystal or a suspended particle device.

In a further non-limiting embodiment of any of the foregoing apparatus, the vehicle component comprises a vehicle light or display.

In a further non-limiting embodiment of any of the foregoing apparatus, the transparent lighting source comprises a transparent lighting film that is laminated to the switchable opaque film to form a layered structure, and wherein the electrical connection comprises a flexible printed circuit that connects the transparent lighting film and the switchable opaque film to the control unit.

In a further non-limiting embodiment of any of the foregoing apparatus, the layered structure is attached to at least one layer of glass of a vehicle window such that the switchable opaque film is facing a vehicle interior direction and the transparent lighting film is facing a vehicle exterior direction.

In a further non-limiting embodiment of any of the foregoing apparatus, the control unit is configured to switch the switchable opaque film to the opaque state when the transparent lighting film is on to block light emitted by the transparent lighting film from going inside a vehicle, and wherein the control unit is configured to switch the switchable opaque film to the transparent state when the transparent lighting film is off such that the vehicle window is transparent.

In a further non-limiting embodiment of any of the foregoing apparatus, the layered structure is integrated between at least two layers of glass of the vehicle window, and wherein the vehicle component comprises a light bar or a center high-mounted stop lamp.

In a further non-limiting embodiment of any of the foregoing apparatus, the transparent lighting source comprises a transparent display unit that is laminated to the switchable opaque film to form a layered structure for a display system, and wherein the electrical connection comprises a flexible printed circuit that connects the transparent display unit and the switchable opaque film to the control unit.

In a further non-limiting embodiment of any of the foregoing apparatus, the layered structure is attached to at least one layer of glass of a vehicle window, and including at least one camera that feeds display data to the display system.

In a further non-limiting embodiment of any of the foregoing apparatus, the control unit is configured to switch the switchable opaque film to the opaque state when the transparent display unit is on to darken an image background for improved contrast, and wherein the control unit is configured to switch the switchable opaque film to the transparent state when the transparent display unit is off such that the vehicle window is transparent.

In a further non-limiting embodiment of any of the foregoing apparatus, the layered structure is integrated between at least two layers of glass of the vehicle window, and wherein the vehicle component provides a rear view mirror or a side view mirror function, or wherein the layered structure is incorporated into a glass panel to form an invisible mirror.

A method according to still another exemplary aspect of the present disclosure includes, among other things, bonding a transparent lighting source to a switchable opaque film to provide a vehicle component; connecting the transparent lighting source and the switchable opaque film to a control unit such that the switchable opaque film is electrically controlled to switch between an opaque state and a transparent state; and independently controlling the switchable opaque film and the transparent lighting source based on a predetermined application for the vehicle component.

In a further non-limiting embodiment of the foregoing method, the transparent lighting source comprises a transparent lighting film, and the method includes laminating the transparent lighting film to the switchable opaque film to form a layered structure, and using a flexible printed circuit to connect the transparent lighting film and the switchable opaque film to the control unit.

In a further non-limiting embodiment of any of the foregoing methods, the method includes attaching the layered structure to at least one layer of glass of a vehicle window such that the switchable opaque film is facing a vehicle interior direction and the transparent lighting film is facing a vehicle exterior direction, switching the switchable opaque film to the opaque state when the transparent lighting film is on to block light emitted by the transparent lighting film from going inside a vehicle, and switching the switchable opaque film to the transparent state when the transparent lighting film is off such that the vehicle window is transparent.

In a further non-limiting embodiment of any of the foregoing methods, the transparent lighting source comprises a transparent display unit, and the method includes laminating the transparent display unit to the switchable opaque film to form a layered structure for a display system, using a flexible printed circuit to connect the transparent display unit and the switchable opaque film to the control unit, attaching the layered structure to at least one layer of glass of a vehicle window; and providing at least one camera that feeds display data to the display system.

In a further non-limiting embodiment of any of the foregoing methods, the method includes switching the switchable opaque film to the opaque state when the transparent display unit is on to darken an image background for improved contrast, and switching the switchable opaque film to the transparent state when the transparent display unit is off such that the vehicle window is transparent.

In a further non-limiting embodiment of any of the foregoing methods, the transparent lighting source comprises at least one of an organic light emitting diode, micro light emitting diode, or quantum dot, and wherein the switchable opaque film comprises a polymer-dispersed liquid crystal or a suspended particle device.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
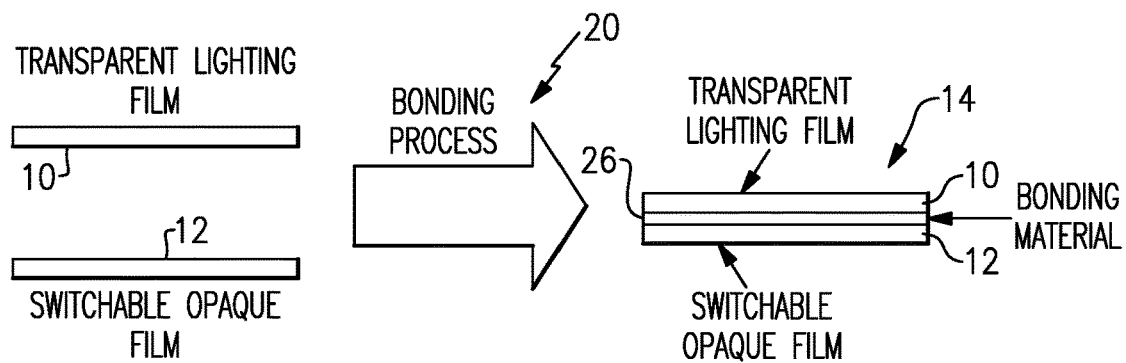
FIG. 1 schematically illustrates one example of a switchable opaque film and a transparent lighting source that form a layered structure.

This disclosure details exemplary vehicle lighting and display systems, and more specifically details the use of a transparent light source and switchable opaque film in such systems. FIG. 1 shows a transparent lighting source 10 and a switchable opaque film 12 bonded to the transparent lighting source 10 to provide a layered structure 14. The layered structure 14 is configured to comprise a vehicle component, which will be explained in greater detail below.

Figure 2:
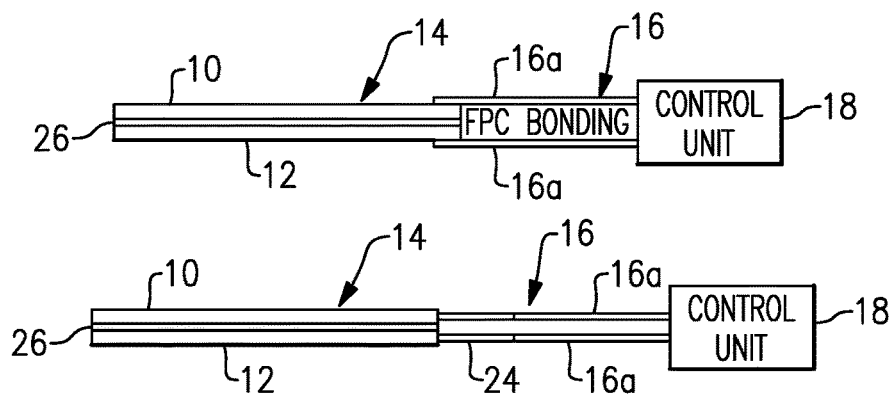
FIG. 2 schematically illustrates the layered structure of FIG. 1 as connected to a control unit.

As shown in FIG. 2, an electrical connection 16 connects to the transparent lighting source 10 and the switchable opaque film 12 such that the switchable opaque film 12 is electrically controlled to switch between an opaque state and a transparent state. A control unit 18 independently controls the switchable opaque film 12 and the transparent lighting source 10 based on a predetermined application for the vehicle component.

The control unit 18 can be a dedicated controller or can be part of another control unit for another vehicle system. The control unit 18 can include a processor, memory, and one or more input and/or output (I/O) device interface(s) that are communicatively coupled via a local interface, such as one or more buses and/or other wired or wireless connections, for example. The control unit 18 may be a hardware device for executing software, particularly software stored in memory. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The software in the memory may include one or more separate programs, each of which includes an ordered listing of executable instructions for implementing logical functions. The control unit 18 can be configured to execute software stored within the memory, to communicate data to and from the memory, and to generally control operations of the computing device pursuant to the software.

FIGS. 1-6B show examples of an exterior lighting configuration. For vehicle lighting systems, the transparent lighting source 10 comprises a transparent lighting film 10 that is bonded to the switchable opaque film 12. The transparent lighting film 10 is used as a light source and the switchable opaque film 12 is used as a light blocking unit.

Examples of structures that can be used for the transparent lighting film 10 include, for example, transparent Organic Light Emitting Diode (OLED) lighting technology, Micro- LED technology, and/or Quantum Dot LED lighting. The transparent OLED lighting technology is readily available and will continue to provide even higher brightness as the technology develops. Micro-LED is an emerging technology that will be able to provide the brightness to achieve exterior lighting requirements. Micro-LEDs can be manufactured on Low Temperature Poly Silicon (LTPS) fab, for example. Further, Micro-LEDs meet environmental requirements and allow for both rigid glass or flexible film based transparent emissive technology. Quantum Dot LED lighting is also an emerging technology that would be suitable for the transparent lighting film 10. Quantum dots (QDs) are man-made nanoscale crystals that can transport electrons/photons. When UV light or an electric field hits these semiconducting nanoparticles, QDs can emit light of various colors.

As discussed above, the switchable opaque film 12 can be electrically controlled to switch between opaque state and transparent state. In one example, Polymer-dispersed Liquid Crystal (PDLC) technology can be used to provide the switchable opaque film 12. In another example, Suspended Particle Devices (SPD) can be used to provide the switchable opaque film 12.

As shown in FIG. 1, the transparent lighting film 10 and the switchable opaque film 12 are laminated together via a bonding process 20. In one example, the two different films 10, 12 are formed separately on their own substrates, either rigid or flexible, using their own manufacturing technologies. The two films 10, 12 are then laminated together using an optical bonding process, for example. The bonding process may result in a layer of boding material 26 between the transparent lighting film 10 and switchable opaque film 12.

Figure 3:
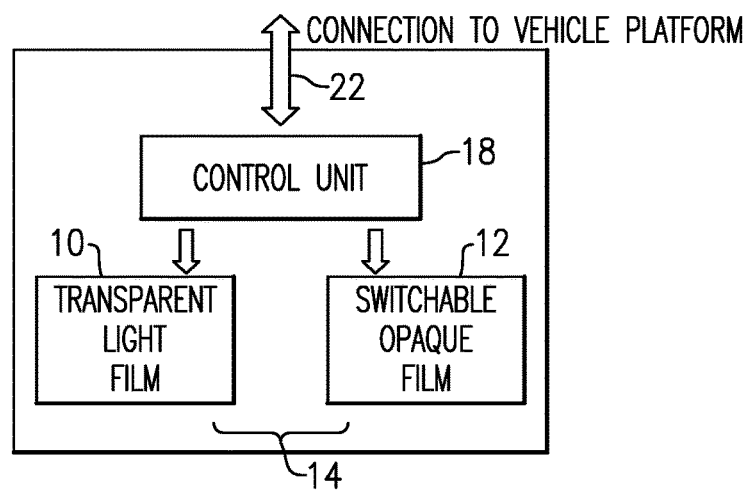
FIG. 3 is a block diagram of a control system for the layered structure of FIG. 1.
Figure 4:
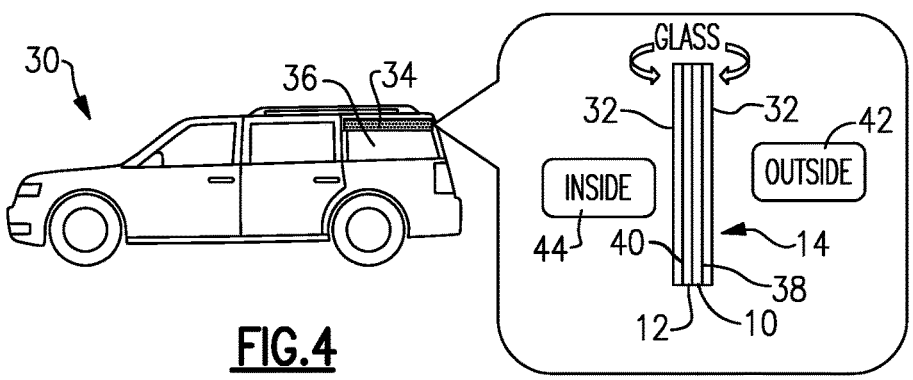
FIG. 4 schematically illustrates one example of a vehicle use for the layered structure of FIG. 1.

The control unit 18 is used to connect the layered structure 14, i.e. the vehicle component, to any of various vehicle platforms 22 for vehicle lighting systems as shown in FIG. 3. In one example, the electrical connection 16 comprises Flexible Printed Circuits (FPCs) 16a, which are used for the physical connection between the control unit 18 and both the transparent lighting film 10 and the switchable opaque film 12 as shown in FIG. 2. Bonding of the FPCs 16a can be on outwardly facing surfaces of the transparent lighting film 10 and switchable opaque film 12 as shown in the upper example in FIG. 2. Optionally, as shown in the lower example in FIG. 2, additional conductive transparent trace lines 24 can be designed on film substrates where transparency of the wire connection is required, such as when the layered structure 14 is to be associated with a piece of glass. The conductive transparent trace lines 24 can be conductive ink, indium tin oxide (ITO), metal mesh and silver nanowire, etc., for example.

The transparent lighting film 10 and the switchable opaque film 12 are controlled by one control unit 18; however the transparent lighting film 10 and the switchable opaque film 12 can operate independently through the control unit 18 based on different use cases. In one example, when the transparent lighting film 10 is triggered on, the switchable opaque film 12 is opaque to block lights going into a vehicle cabin, and when the lighting film 10 is off, the switchable opaque film 12 is transparent and the whole layered structure 14 acts like a normal piece of glass.

This layered structure 14 can be put on multiple locations in a vehicle 30 as shown in FIGS. 4 and 5A-5C. In one example, the layered structure 14 is laminated in glass 32 to provide a light bar 34 for a vehicle 30 as shown FIG. 4. Thus, in this example, the layered structure 14 is used to provide a vehicle component that comprises a vehicle light bar 34 that is located within a rear side window 36 of the vehicle 30. The location and size of the light bar 34 is just one example, and it should be understood that the lighting component/area can be on any vehicle glass areas and designed into any size or shape. Further, the lighting area can be on a fixed glass area or a moving window. In one example, different lighting colors are used based on different use cases or on different areas.

In one example, a first glass layer 32 is laminated on an exterior facing surface 38 of the transparent lighting film 10 and a second glass layer 32 is laminated on an interior facing surface 40 of the switchable opaque film 12. The exterior facing surface 38 faces outside of the vehicle, e.g. an external environment 42, and the interior facing surface 40 faces inside the vehicle 30, e.g. an internal or passenger cabin environment 44. Thus, the switchable opaque film 12 is facing inside 44 and the transparent lighting film 10 is facing outside 42.

In one example, the lamination process is done by optical bonding technologies. The films do not have to be formed in the glass manufacturing process. In one example, only one layer of glass 32 could be associated with the layered structure; however, being laminated between two layers of glass provides better protection for the films 10, 12.

In one example, when the transparent lighting film 10 is on, such as being activated in response to a braking event, the switchable opaque film 12 is switched to be opaque to block light from going inside the vehicle 30. When the transparent lighting film 10 is off, such as when the braking event is over, the switchable opaque film 12 is switched to be transparent and the whole system is transparent like a normal piece of glass.

Figure 5A:
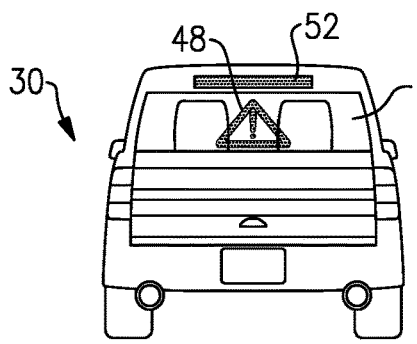
FIG. 5A schematically illustrates another example of a vehicle use for the layered structure of FIG. 1.

This layered structure 14 can be used to form a vehicle component, such as a center high-mounted stop lamp (CHMSL) 52, for example, as shown in FIG. 5A. CHMSLs using this layered structure 14 can be integrated into a rear window 46 without any cut-out areas in the glass being necessary. This allows vehicles 30 to use the complete back area as a rear window 46 without blocking a specific area as would be required for a traditional light emitting diode (LED) light housing for a CHMSL. Thus, the use of the layered structure 14 eliminates the housing and packaging required for existing lighting applications.

The layered structure 14 can also be designed into any shape. For example, as shown in FIG. 5A, the layered structure 14 is formed to provide an informative sign 48 that is integrated into the rear window 46. The sign 48 can be activated to light up when the driver hits the brake or the vehicle 30 is stopped for some reason. When the light is deactivated, the whole rear window 46 is transparent like a normal piece of glass.

Figure 5B:
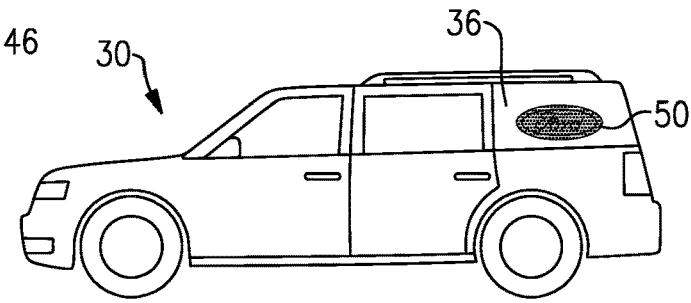
FIG. 5B schematically illustrates another example of a vehicle use for the layered structure of FIG. 1.
Figure 5C:
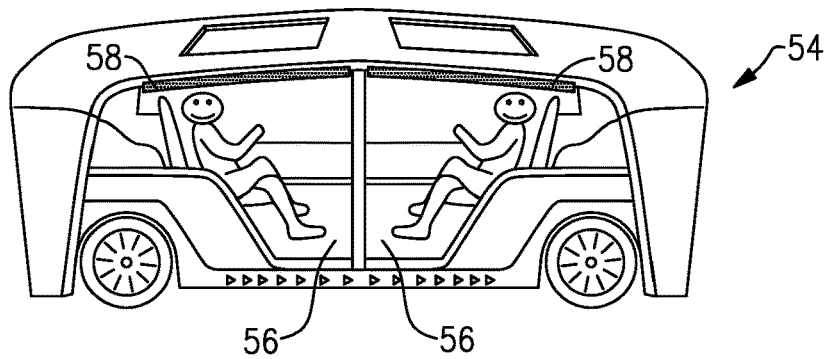
FIG. 5C schematically illustrates another example of a vehicle use for the layered structure of FIG. 1.

FIG. 5B shows an example of using the layered structure 14 to provide a signage feature 50 such as a logo, advertising, ride service indicator, etc. FIG. 5C shows another example where the layered structure 14 can be used for a ride sharing autonomous vehicle 54. The layered structure 14 is integrated into glass door panels 56 as light bars 58 for pedestrian communication and vehicle movement indication. These light bars 58 can also be implemented anywhere on the vehicle 54, such as around the entire vehicle tiara area, for example. When the vehicle 54 slows down to pick up a rider, the light bars 58 can shine a moving light, such as arrows or small moving light bars, to tell people it's slowing down and ready to stop. Light bars 58 can also be used to indicate that doors are opening or closing, as well as other applications.

In another example, the layered structure 13 can be integrated into a glass panel such that it can act as a piece of privacy glass when necessary. The transparency of the switchable opaque film 12 can be changed between a minimum value and a maximum value according to the input voltage, and thus can control the amount of light blockage through the glass.

Additionally, the transparent lighting film 10 and the switchable opaque film 12 do not have to have the same size or shape. For example, there can be a large size of switchable opaque film 12 to cover a whole piece of side glass 60 (FIG. 6A), while keeping the transparent lighting film 10 only in some specific zones with special shapes/patterns for different purposes. This can be accomplished by adding additional transparent ITO trace lines 24 where needed. When the lighting film 10 is on/activated, the whole switchable opaque film 12 can be opaque or only the corresponding areas can be opaque, and when the lighting film 10 is off/deactivated it can be used as a piece of privacy glass as the whole area of switchable opaque film 12 can be dimmed.

Figure 6A:
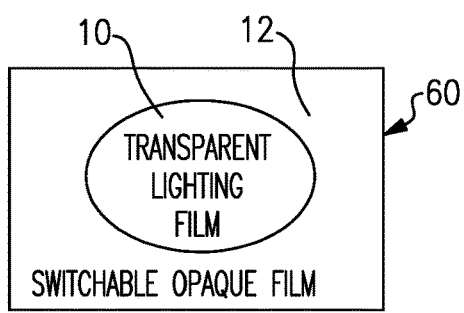
FIG. 6A schematically illustrates another example of the layered structure of FIG. 1.
Figure 6B:
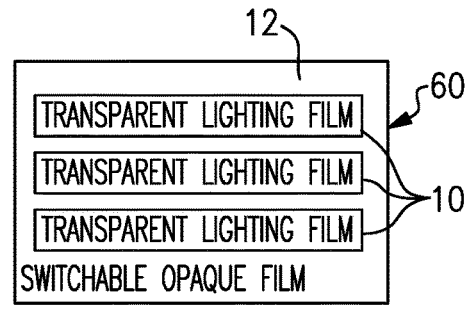
FIG. 6B schematically illustrates another example of the layered structure of FIG. 1.

FIG. 6A shows an example where the switchable opaque film 12 covers a whole piece of side glass 60 in combination with an oval shaped single transparent film 10 having a smaller area. FIG. 6B shows another example where the switchable opaque film 12 covers a whole piece of side glass 60 in combination with a plurality of discrete transparent lighting film 10 areas that have smaller areas.

The subject disclosure provides a layered structure 14 that integrates a transparent lighting film 10 and a switchable opaque film 12 to be used as a vehicular exterior lighting solution. The control unit 18 coordinates the films to switch between a transparent state and a lighting state, which can also be controlled to vary intensity. The layered structure 14 can be directly integrated into glass and provides great flexibility in shape, size, and function.

The disclosed structure provides several benefits over traditional LEDs, which are the most commonly used exterior lighting technology. LEDs are point light sources, which emit non-uniform lights if integrated as a light panel. Another issue is that traditional LEDs are not transparent. Either they require dedicated areas in exterior body integration or they are to be used as stand-alone components on vehicles. Further, LEDs cannot be laminated into existing vehicle glass, which constrains the flexibility of vehicle designs. The disclosed layered structure 14 addresses all of these issues by providing a film structure that can be easily integrated into a glass structure, which provides for elimination of various LED light structures as well as providing for increased design flexibility and customization.

FIGS. 7-13 show examples of a vehicle display configuration that utilizes the layered structure 14. In these examples, the transparent lighting source 10 comprises a transparent display unit 10a that is bonded to the switchable opaque film 12 to form the layered structure 14.

Examples of structures that can be used for the transparent display unit 10a include, for example, transparent Organic Light Emitting Diode (OLED) lighting technology, Micro-LED technology, and/or Quantum Dot LED lighting. The transparent OLED lighting technology is readily available and will continue to provide even higher luminance and transparency as the technology develops. Micro-LED is an emerging technology that will be able to provide the desired display requirements. Quantum Dot LED lighting is also an emerging technology that would be suitable for the transparent display unit 10a.

As discussed above, the switchable opaque film 12 can be electrically controlled to switch between opaque state and transparent state. In one example, Polymer-dispersed Liquid Crystal (PDLC) technology can be used to provide the switchable opaque film 12. In another example, Suspended Particle Devices (SPD) can be used to provide the switchable opaque film 12.

One issue of using transparent displays to display images is that transparent displays cannot provide high contrast ratio. The switchable opaque film 12 addresses this issue by darkening the image background when the display is on, and by keeping it transparent when the transparent display unit is off to maintain transparency of vehicle windshields.

In one example, the layered structure 14 comprises a vehicle display component that is integrated into a vehicle windshield and is used to display rear view or side view images as would traditionally have been supplied by rear and/or side view mirrors. The display can switch between display mode and transparent mode with coordination of the display unit 10a and switchable opaque film unit 12 by the control unit 18.

Figure 7:
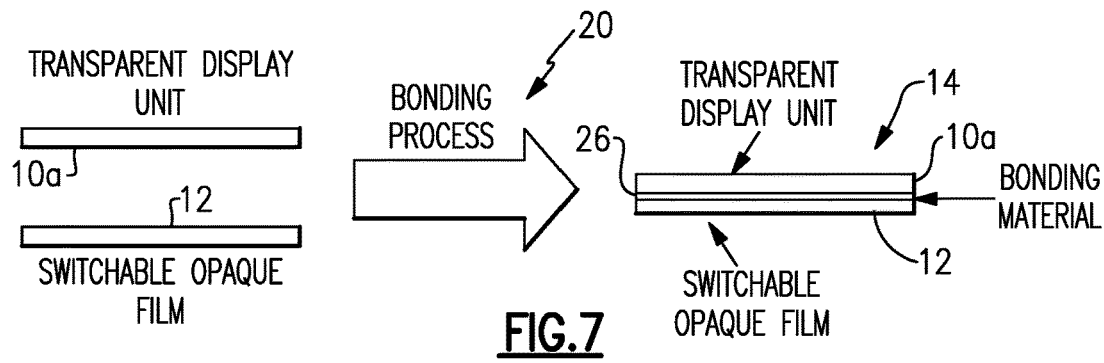
FIG. 7 schematically illustrates another example of a switchable opaque film and a transparent lighting source that form another layered structure.
Figure 8:
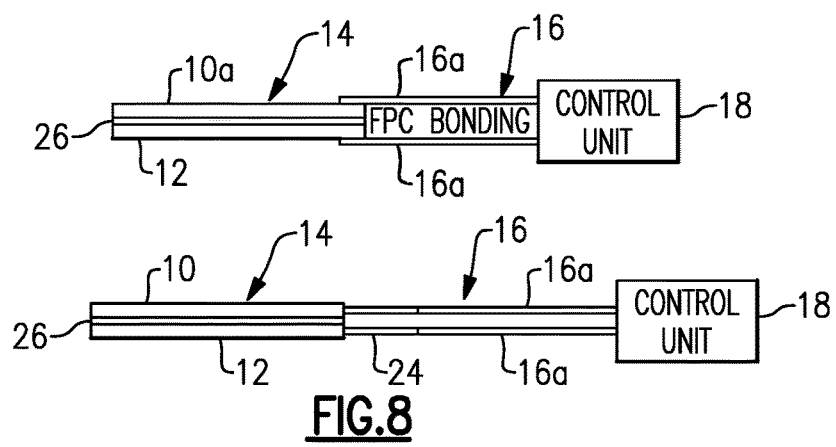
FIG. 8 schematically illustrates the layered structure of FIG. 2 as connected to a control unit.

FIG. 7 shows that the transparent display unit 10a and the switchable opaque film 12 are laminated together via a bonding process 20. In one example, the two different elements 10a, 12 are formed separately on their own substrates, either rigid or flexible, using their own manufacturing technologies. The two elements 10a, 12 are then laminated together using an optical bonding process, for example. The bonding process may result in a layer of boding material 26 between the transparent display unit 10a and switchable opaque film 12.

Figure 9:
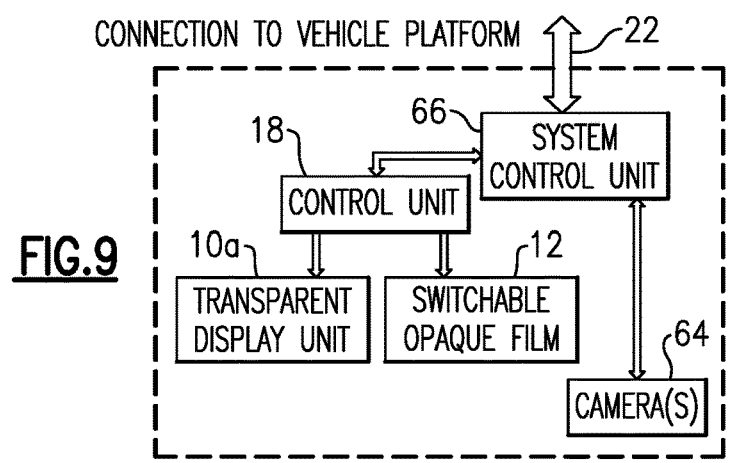
FIG. 9 is a block diagram of a control system for the layered structure of FIG. 7.

The control unit 18 is used to connect the layered structure 14, i.e. the vehicle display component, to any of various vehicle platforms 22 for vehicle display systems as shown in FIG. 9. In one example, the electrical connection 16 comprises Flexible Printed Circuits (FPCs) 16a, which are used for the physical connection between the control unit 18 and both the transparent display unit 10a and the switchable opaque film 12 as shown in FIG. 2. Bonding of the FPCs 16a can be on outwardly facing surfaces of the transparent display unit 10a and switchable opaque film 12 as shown in the upper example in FIG. 8. Optionally, as shown in the lower example in FIG. 8, additional conductive transparent trace lines 24 can be designed on substrates where transparency of the wire connection is required, such as when the layered structure 14 is to be associated with a display in the middle of a piece of glass. The conductive transparent trace lines 24 can be conductive ink, indium tin oxide (ITO), metal mesh and silver nanowire, etc., for example.

The transparent display unit 10a and the switchable opaque film 12 are controlled by one control unit 18; however the transparent display unit 10a and the switchable opaque film 12 can operate independently through the control unit 18 based on different use cases.

As shown in FIG. 9, at least one camera 64 is installed on the vehicle 30 to provide the appropriate videos/display data to the display system. All components are connected to a system control unit 66, which then connects to vehicle platforms 22. The system control unit 66 is configured similar to that of the control unit 18 in structure and function. Additionally, the control units 18, 66 could be integrated into a common control unit.

Figure 10:
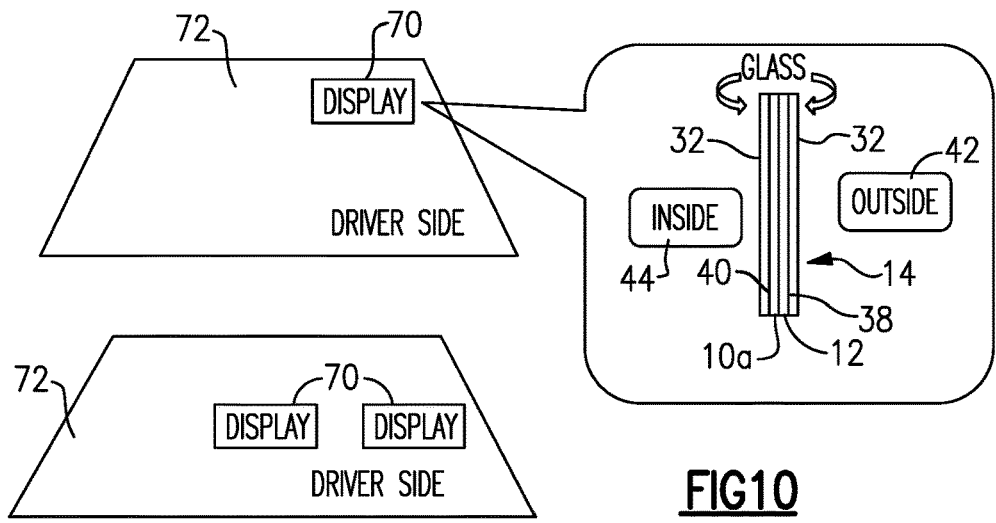
FIG. 10 schematically illustrates examples of a vehicle use for the layered structure of FIG. 7.

FIG. 10 shows an example that includes a windshield display 70 that is in integrated into a windshield 72. The windshield display 70 comprises the layered structure 14 and the control unit 18 strategically controls the elements 10a, 12 for various vehicle states. One or more displays 70 are put on multiple locations of the vehicle windshield 72 based on use cases. The upper left windshield 72 shows a display 70 that is used for rear view images that have traditionally been provided by a rear view mirror. The lower left windshield 72 shows two displays 70 that are used for side view images that have traditionally been provided by side view images. The locations and sizes shown in FIG. 10 are just examples, and it should be understood that other configurations could be used dependent upon application and viewing requirements.

The right side of FIG. 10 shows an example of the display as laminated into the windshield 72, between two pieces of glass 32. The lamination process is done by optical bonding technologies. In one example, the display could also be associated with one piece of glass 32; however, being laminated between two pieces of glass 32 provides better protection for the display. In this example, the switchable opaque film 12 is facing outside 42 and the transparent display unit 10a is facing inside 44.

When the transparent display unit 10a is on/activated, the switchable opaque film 12 is switched to be opaque to darken image background for better contrast. When the transparent display unit 10a is off/deactivated, the switchable opaque film 12 is switched to be transparent and the whole display component is transparent like a normal piece of glass. This is often referred to as providing an "invisible mirror" function.

In one example, the display is used to replace the traditional rear view mirror. In this case, the display is put in the traditional rear view mirror zone or somewhere in front of the driver, avoiding any critical transparent zones. The display will work with one or more cameras 64 to act as a rear view mirror display and stay transparent like an "invisible mirror" when it is not in use.

Figure 11:
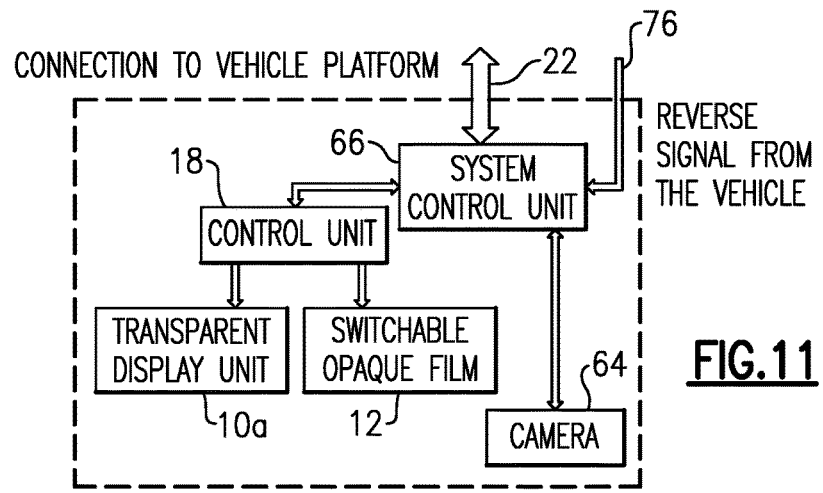
FIG. 11 is a block diagram of a control system similar to FIG. 9 but with a reverse signal from a vehicle.

In another example, the display is only used to provide back-up assistance. In this case, the display is not supposed to replace the traditional rear view mirror, but is instead a supplement for the rear view mirror. The display is put up high in front of the driver, out of any critical transparent zones. Optionally, the display can be put right in front of the driver, if allowable. The display will work with a wide field of view camera for back-up assistance, and stay transparent when not in use. A reverse signal 76 from the vehicle 30 is used as a trigger to turn on/off the display as shown in FIG. 11.

Figure 12:
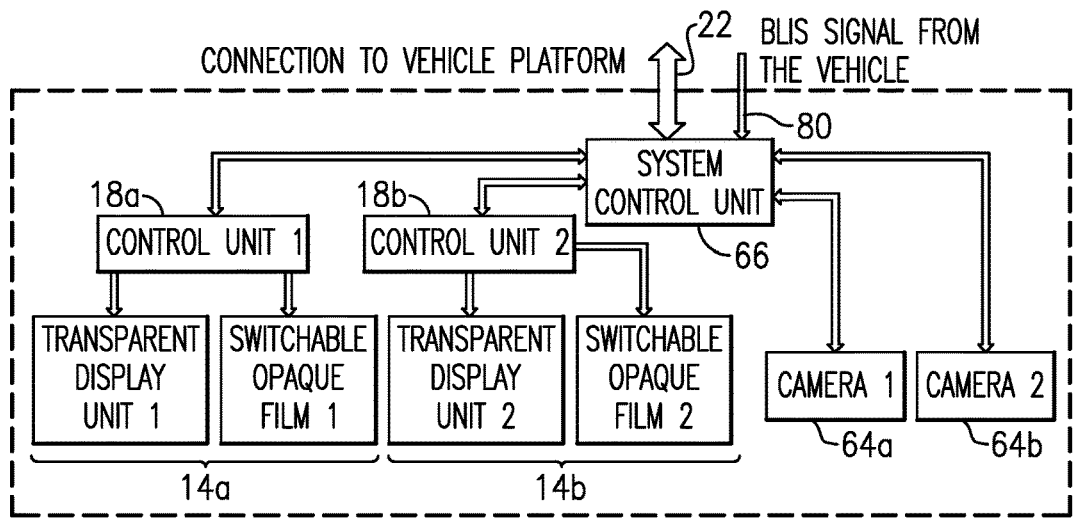
FIG. 12 is a block diagram of a control system similar to FIG. 9 but another vehicle use.

In another example, two displays are put in the windshield 72 when they are used for side view images as shown in the lower left part of FIG. 10. In this configuration, these two displays will work with two cameras 64 separately to show side images, and stay transparent when not in use. This can be used to replace traditional side mirrors. In this example, each layered component 14a, 14b has a separate control unit 18a, 18b and a separate camera 64a, 64b. All components are in communication with the system control unit 66 that connects to the vehicle platforms 22 as shown in FIG. 12. A blind spot signal 80 can also be communicated to the system control unit 66 to be displayed on the side images as needed.

Figure 13:
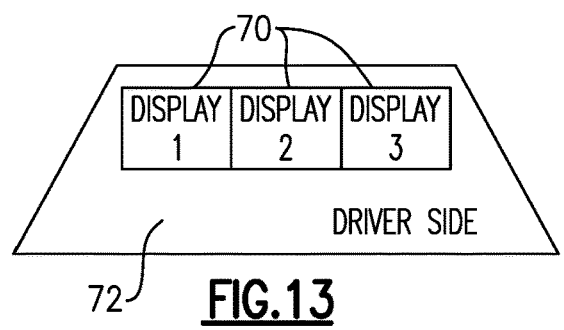
FIG. 13 schematically illustrates another example of a vehicle use for the layered structure of FIG. 7.

In another example shown in FIG. 13, several displays 70 can be combined together to show multiple camera images around a vehicle or put multiple images in a large size display. This can be used to display a 360 view around the vehicle 30.

The subject disclosure provides a layered structure 14 that integrates and controls a transparent display 10a and a switchable opaque film 12 to be used as a vehicle windshield display solution. The display 10a and film 12 are controlled to switch between a display state and a transparent state to meet applicable regulations as needed. The subject disclosure can eliminate traditional mirrors, which would reduce packaging and weight.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method comprising:
    forming a vehicle light configuration or a vehicle display configuration comprising a layered structure by bonding a transparent lighting source to a switchable opaque film;
    connecting the transparent lighting source and the switchable opaque film to a control unit such that the switchable opaque film is electrically controlled to switch between an opaque state and a transparent state; and
    independently controlling the switchable opaque film and the transparent lighting source based on a predetermined application for the vehicle light configuration or the vehicle display configuration.

2. The method according to claim 1, wherein the transparent lighting source comprises a transparent lighting film, and including
    laminating the transparent lighting film to the switchable opaque film to form the layered structure, and
    using a flexible printed circuit to connect the transparent lighting film and the switchable opaque film to the control unit.

3. The method according to claim 2, including
    attaching the layered structure to at least one layer of glass of a vehicle window such that the switchable opaque film is facing a vehicle interior direction and the transparent lighting film is facing a vehicle exterior direction,
    switching the switchable opaque film to the opaque state when the transparent lighting film is on to block light emitted by the transparent lighting film from going inside a vehicle, and
    switching the switchable opaque film to the transparent state when the transparent lighting film is off such that the vehicle window is transparent.

4. The method according to claim 1, wherein the transparent lighting source comprises a transparent display unit, and including
    laminating the transparent display unit to the switchable opaque film to form a layered structure for a display system,
    using a flexible printed circuit to connect the transparent display unit and the switchable opaque film to the control unit,
    attaching the layered structure to at least one layer of glass of a vehicle window; and
    providing at least one camera that feeds display data to the display system.

5. The method according to claim 4, including
- switching the switchable opaque film to the opaque state when the transparent display unit is on to darken an image background for improved contrast, and
- switching the switchable opaque film to the transparent state when the transparent display unit is off such that the vehicle window is transparent.

6. The method according to claim 1, wherein the transparent lighting source comprises at least one of an organic light emitting diode, micro light emitting diode, or quantum dot.

7. The method according to claim 1, wherein the switchable opaque film comprises a polymer-dispersed liquid crystal or a suspended particle device.

8. The method according to claim 1, wherein the vehicle light configuration comprises an exterior vehicle light, and including integrating the layered structure forming the exterior vehicle light into a vehicle window.

9. The method according to claim 8, wherein the exterior vehicle light comprises a light bar and/or a center high-mounted stop lamp.

10. The method according to claim 1, wherein the vehicle light configuration comprises an informative sign or branding sign, and including integrating the layered structure forming the informative sign or branding sign into a vehicle window.

11. The method according to claim 1, wherein the vehicle display configuration comprises a display component, and including integrating the layered structure forming the display component into a vehicle glass component.

12. The method according to claim 11, wherein the display component comprises a display system and the vehicle glass component comprises a vehicle windshield, and including integrating the display system into the vehicle windshield, and configuring the display system to include a vehicle rear view display and/or a vehicle side view display.

13. The method according to claim 12, including providing at least one camera that communicates vehicle rear and side view videos and display data to the display system.

14. The method according to claim 1, including integrating the layered structure between at least two layers of glass of a vehicle window, and wherein the vehicle display configuration provides a rear view mirror or a side view mirror function.

15. The method according to claim 1, including integrating the layered structure into a glass panel to form an invisible mirror.

16. The method according to claim 1, wherein the vehicle display configuration comprises a display system that includes a plurality of discrete displays, and including integrating the plurality of discrete displays into a vehicle windshield at multiple discrete locations.

17. The method according to claim 1, wherein the transparent lighting source comprises a transparent lighting film that is laminated to the switchable opaque film, and including providing the transparent lighting film and the switchable opaque film to have a different size and/or shape from each other.

18. The method according to claim 17, including providing the switchable opaque film with a first size and providing the transparent lighting film with a second size smaller than the first size.

19. The method according to claim 18, including only locating the transparent lighting film in specific zones on the switchable opaque film in a specified shape and/or pattern.

20. A method comprising:
- forming a vehicle light configuration or a vehicle display configuration comprising a layered structure by bonding a transparent lighting source to a switchable opaque film;
- integrating the layered structure into a vehicle glass structure;
- connecting the transparent lighting source and the switchable opaque film to a control unit such that the switchable opaque film is electrically controlled to switch between an opaque state and a transparent state; and
- independently controlling the switchable opaque film and the transparent lighting source based on a predetermined application for the vehicle light configuration or the vehicle display configuration.

* * * * *